Nov. 6, 1923. 1,473,569
J. G. LEYNER
GROUND TREADING ENDLESS TRACTION TRACK AND ITS SUPPORTING TRUCK
Original Filed April 17, 1920    4 Sheets-Sheet 1
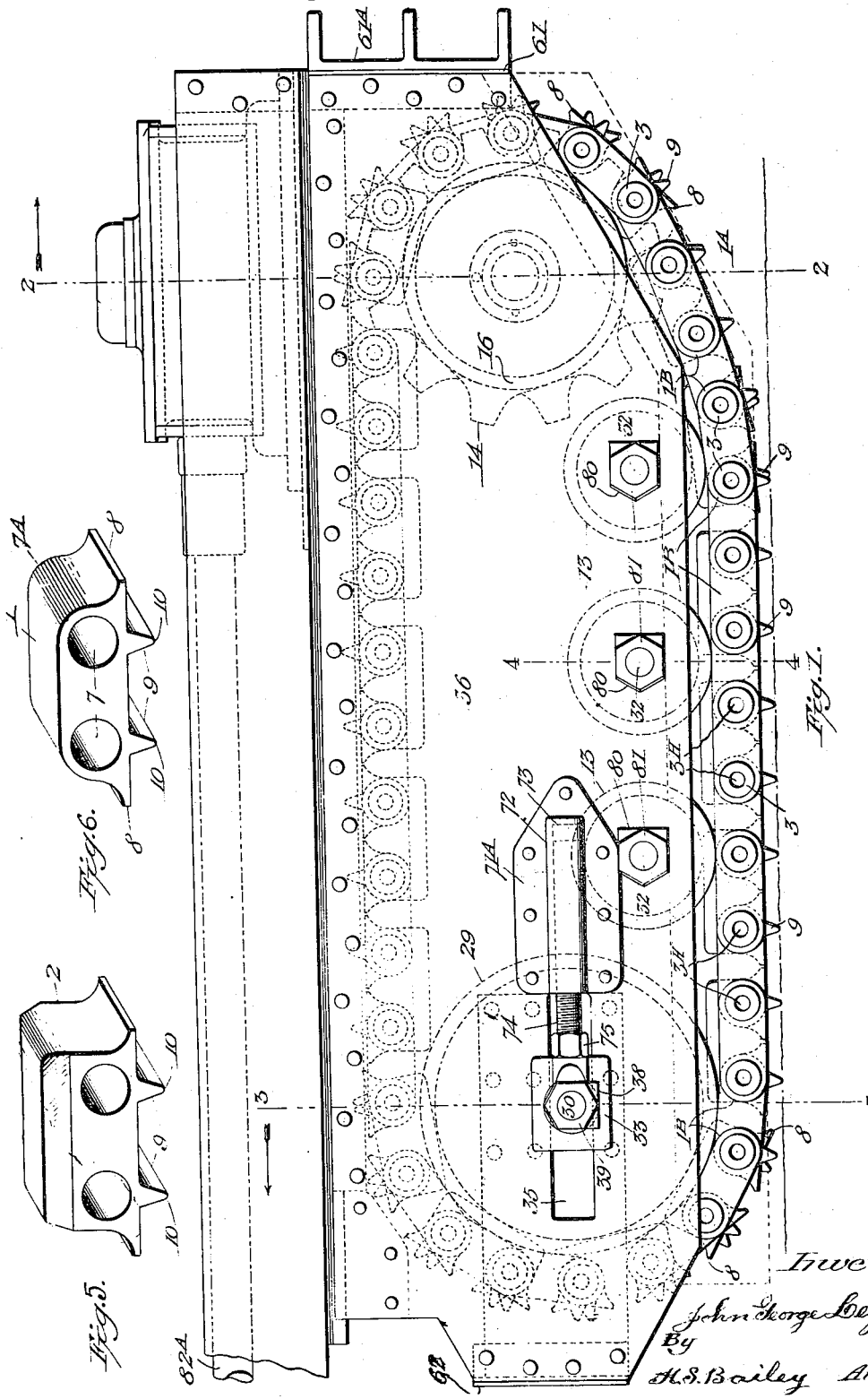

Nov. 6, 1923.
J. G. LEYNER
1,473,569
GROUND TREADING ENDLESS TRACTION TRACK AND ITS SUPPORTING TRUCK
Original Filed April 17, 1920    4 Sheets-Sheet 2
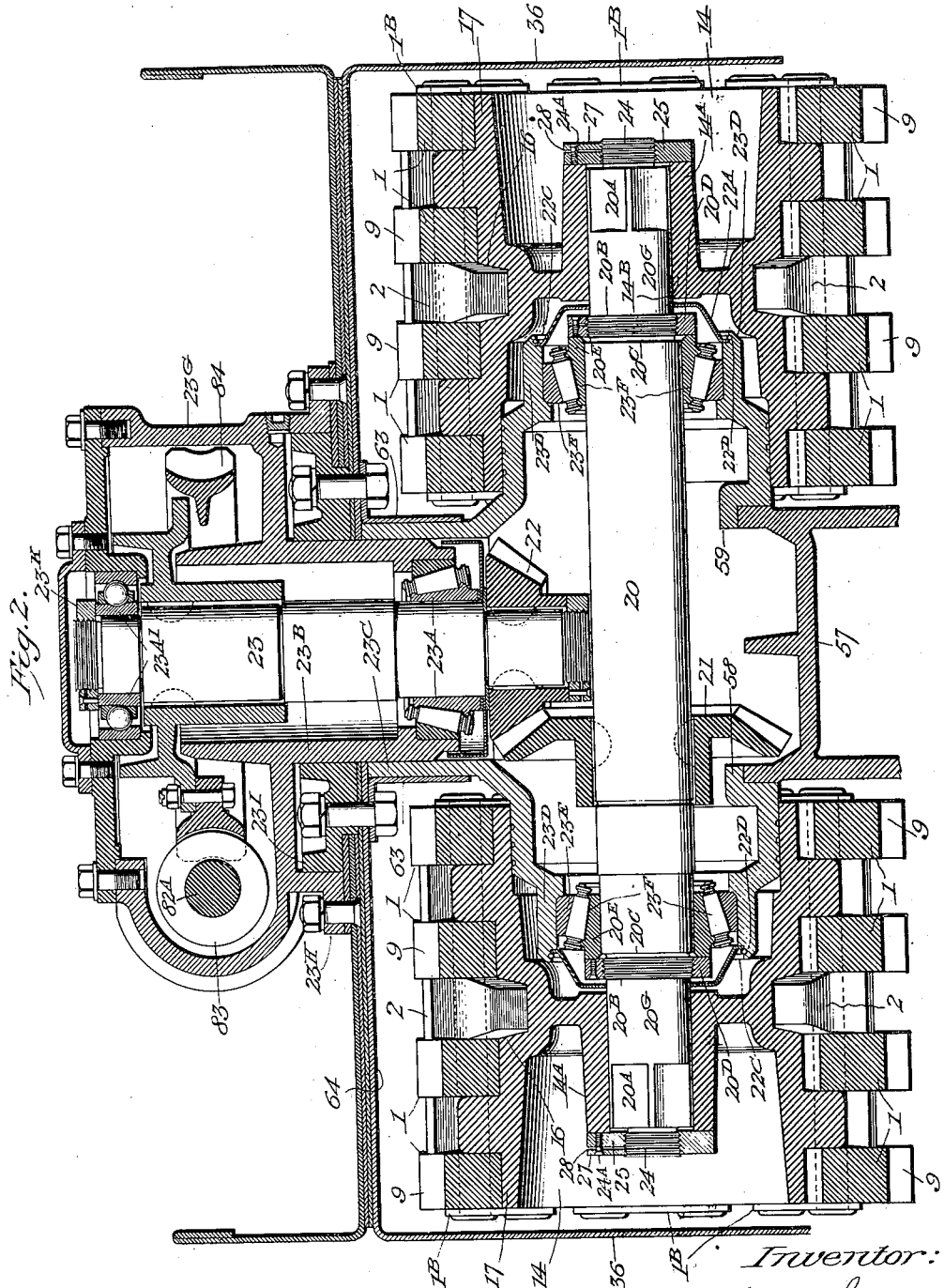

Nov. 6, 1923. 1,473,569
J. G. LEYNER
GROUND TREADING ENDLESS TRACTION TRACK AND ITS SUPPORTING TRUCK
Original Filed April 17, 1920    4 Sheets-Sheet 3
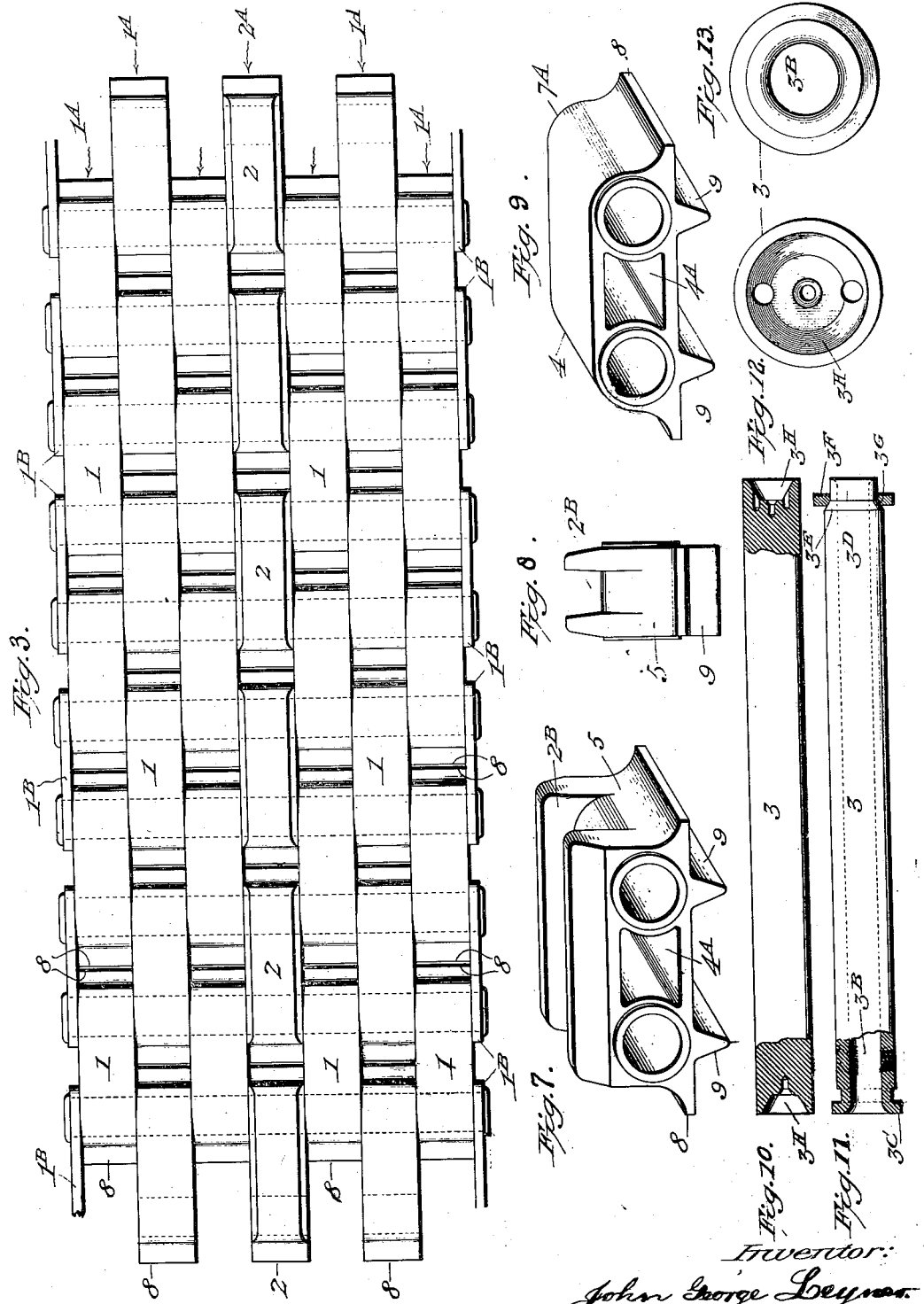

Nov. 6, 1923. 1,473,569
J. G. LEYNER
GROUND TREADING ENDLESS TRACTION TRACK AND ITS SUPPORTING TRUCK
Original Filed April 17, 1920 4 Sheets-Sheet 4
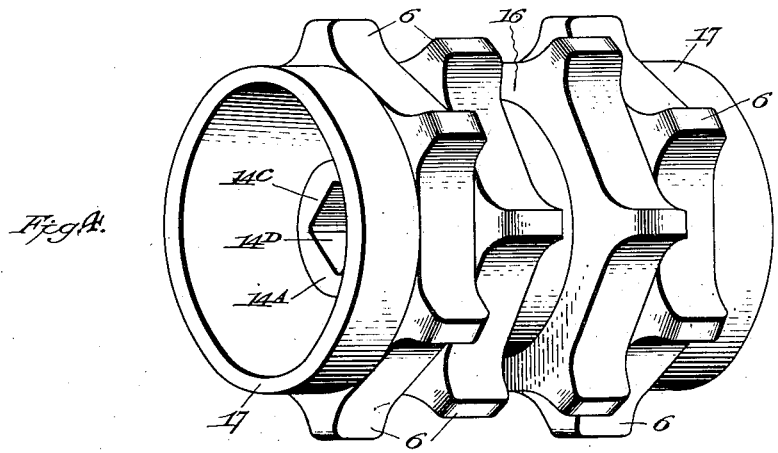
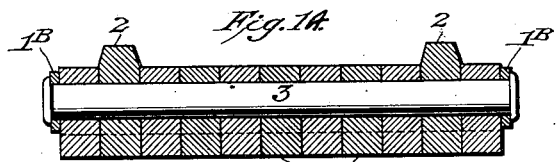
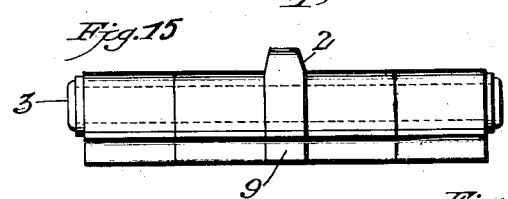
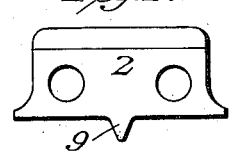
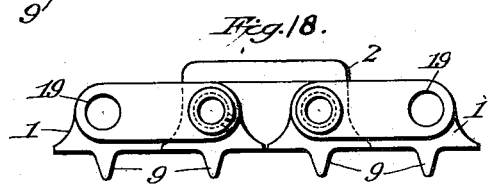
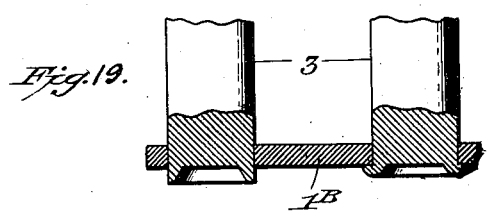
Inventor:
John George Leyner
By H. S. Bailey, Attorney Patented Nov. 6, 1923.

1,473,569

UNITED STATES PATENT OFFICE.

JOHN GEORGE LEYNER, OF LITTLETON, COLORADO; LINA M. LEYNER EXECUTRIX OF SAID JOHN GEORGE LEYNER, DECEASED, ASSIGNOR TO THE LEYNER TRACTOR AND MANUFACTURING COMPANY, OF DENVER, COLORADO, A CORPORATION OF COLORADO.

GROUND-TREADING ENDLESS TRACTION TRACK AND ITS SUPPORTING TRUCK.

Application filed April 17, 1920, Serial No. 374,723. Renewed June 21, 1923.

*To all whom it may concern:*

Be it known that I, JOHN GEORGE LEYNER, a citizen of the United States of America, residing at Littleton, county of Arapahoe, and State of Colorado, have invented new and useful Ground-Treading Endless Traction Tracks and Their Supporting Trucks, of which the following is a specification.

This invention relates to tractors of the self-laying track or caterpillar type and more particularly to the track by which the propulsion is effected.

It is the general object of the invention to provide a track of the character referred to which is simple in construction and operation, affords a substantially uniform and economical distribution of the forces supplied by the power plant and is durable.

The more particular objects will appear from the specification and the accompanying drawings forming a part thereof.

In the drawings Figure 1 is a side elevation illustrating the forward end of a tractor constructed in accordance with my invention and showing one of the endless tracks, its supporting rollers and its operating sprocket wheel.

Fig. 2 is a transverse, sectional view on the line 2—2 of Figure 1, looking in the direction of the arrow.

Fig. 3 is a plan view of a portion of one of the endless tracks, illustrating the manner of connecting the chains of track links, and the centrally disposed chain of guide links, by link pins.

Fig. 4 is a perspective view of one of the power driven sprocket wheels which operate the endless tracks.

Fig. 5 is a perspective view of one of the guide links of which the central chain of each track is composed.

Fig. 6 is perspective view of one of the track links of which the chains comprising the endless track are composed.

Fig. 7 is a perspective view showing a modified form of the guide link, in which unnecessary metal is omitted to obtain lightness.

Fig. 8 is an end view of the link shown in Figure 7.

Fig. 9 is a perspective view of a modified or light form of track link.

Fig. 10 is a view, partly in section, of the solid form of track link pin.

Fig. 11 is a view similar to Figure 10, but showing a hollow form of pin.

Figs. 12 and 13 are full sized end views of Figures 10 and 11, respectively.

Fig 14 is a transverse section through a track, snowing two chains of guide links.

Fig. 15 is an end view showing the manner of constructing a track of four chains of wide track links and a central chain of guide links.

Figs. 16 and 17 are side views of a track link and guide link, respectively, which are provided with only one grouter or ground-penetrating rib.

Fig. 18 is a side elevation of a fragment of the endless track, showing the flat links through which the link pins pass, and against which the ends of the pins are riveted.

Fig. 19 is sectional view, showing the appearance of the end of the link pin both before and after the riveting action.

The track is made up of a large number of links 1 and 2 which are interconnected to form a plurality of endless rows parallel to one another. For the purpose of illustration I have shown in Fig. 3 a track consisting of seven rows.

Except as to the links forming the middle row 2$^A$ to which special reference will be made later on, all links are alike. The outer or ground-gripping surface of each link in rows 1$^A$ is longer than the inner surface and is preferably provided with transversely extending ribs or teeth 9.

As clearly shown in Figs 6 and 9 the outer portion of each link defines toes 8 extending in opposite direction. From the toes 8 the body of the link curves inwardly toward the center defining a smooth inner surface. Intermediate the ends are formed two transverse openings 7 adapted to receive pins 3 for interconnecting the individual links in series to form the endless rows and to interconnect the individual rows in parallel.

The significance of the form of the links just pointed out is apparent from Fig. 3, The distance of the openings from each other and from the edge of the toes 8 is such that when the links are interconnected by pins 3, the toes of the adjacent links in each row are so close to one another that they almost touch. At the same time the inward curvatures 7$^A$ provide spaces between adjacent links in the row for engagement with the teeth 6 of the sprocket wheel shown in detail in Fig. 4.

The rows of links are transversely interconnected in staggered relation, pin 3 extending alternately through the front end of a link in one row and through the rear end of a link in the next row. The outside rows are additionally interconnected by means of plate links 1$^B$.

The links of the middle row 2$^A$ have on their inner portions projections adapted to extend into a peripheral recess 16 centrally located on the sprocket wheel, as shown in Fig. 4, and into a similar recess 11 on the track-supporting roller 29 and also into a similar recess upon the intermediate idler rollers 13, see Fig. 1. The track is thus prevented from laterally shifting upon the roller 29 and rollers 13.

The portion of the track in engagement with the ground thus presents a substantially continuous surface pressing uniformly upon the ground. The teeth 9 penetrate into the ground and bear in the line of traction against ground which is compacted by the thus continuous surface. There is no room for any part of the ground to yield. The tractive resistance thus produced by the teeth in engagement with the ground and the surface of the track resting upon the ground is much greater than in the case of a track in which there are interspaces or hollows on the track.

The proximity of the links to each other in the rows prevents the accumulation of soil or dirt. Such fragments of soil as may find their way into the narrow spaces between the toes 8 are easily ejected by the sprocket teeth when the respective links pass over the sprocket wheel or drop when the links pass in inverted position from the sprocket wheel to the idler 29. There are no shoulders or notches in which the dirt can stick and accumulate. This appears clearly from Fig. 1.

Figs. 7, 8, 9, 16 and 17 illustrate several of many modifications of which the links are susceptible. The number and size of the teeth 9 is obviously a matter of judgment and may be varied within wide limits according to the conditions of the soil. While the links shown in Figs. 5, 6, 7, 8 and 9 show two teeth 9 and the links in Figs. 16 and 17 show only a single tooth, the links may be provided with teeth over the whole surface.

While the guide links 2 may at their inner surface be provided with solid projections, as shown in Figs. 5 and 16, the projections may be hollowed out to reduce the amount of metal used, as shown in Figs. 7 and 8. There is considerable latitude as to the size and arrangement of these projections.

The form of pins 3 and the mode of securing them against lateral motion may also be varied in many ways. As indicated in Fig. 10, the pins 3 may be provided at their ends with recesses 3$^H$ defining peripheral flanges which may be riveted over against the plate links 1$^B$.

In some cases I may form the pins 3 with an axial bore 3$^B$ to reduce their weight and to save metal. One end may be formed with a head 3$^C$ and the other end with a reduced portion 3$^D$ forming with the pin a tapering shoulder 3$^E$. A washer 3$^F$ which may preferably have tapering aperture 3$^G$ may be secured to the pin when it is in its intended position.

The sprocket wheel 14 has four rows of sprocket teeth 6 and a central peripheral groove or recess 16 previously referred to.

The end portions of the sprocket wheel are made into flat band members 17 which support the outside rows of links 1. It is understood that, if desired two more rows of teeth 6 could be provided on the wheel.

The sprocket wheel 14 receives power from a shaft 20 connected to a power plant which may be mounted on the frame of the tractor.

The shaft 20 is driven by a bevel gear 21 in mesh with a pinion 22 upon the lower end of a vertical shaft 23. The latter is journaled in roller bearings 23$^A$ and ball bearings 23$^{A1}$, as illustrated in Fig. 2.

The shaft 23 is carried in a casing including the casting 23$^B$ which has two opposite cylindrical end portions 23$^D$ surrounding the shaft 20. These portions 23$^D$ carry roller bearings 23$^F$ for the shaft 20, the race ways 20$^E$ being secured to shaft 20.

The shaft 20 is provided with a reduced portion 20$^G$ provided with a screw thread 20$^B$ which extends close to a shoulder 20$^C$ on the shaft. A check nut 20$^D$ is threaded to bear against the ends of the roller bearing race way collars 20$^E$.

The upper end of shaft 23 is provided with a spider casting to which the rim portion of a worm gear 84 is secured.

The worm gear 84 is in mesh with a worm pinion 83 mounted upon a shaft 82$^A$ which may be driven from the power plant.

Above the spider casting the race way for the ball bearing 23$^{A1}$ is secured to the shaft 23 by a check nut 23$^K$.

The casting 23$^B$ carries a housing 23$^G$ which surrounds and encloses the shaft and mechanism connected with it and is supported by a flange portion 23$^H$ and a collar 23$^I$ disposed between the latter and the casting 23$^B$.

At the ends 23$^D$ of casting 23$^C$ I provide dust guards 22$^A$ fitting into a recess 22$^C$ on the casting 23^D and held in position by a spring wire 22^D.

The sprocket wheels 14 have hubs 14^A, the end portions 14^B being provided with bores fitting the round portions 20^G and angular portions 14^D fitting the angular ends 20^A of shaft 20. At its ends the shaft 20 has reduced portions 24 adapted to receive check nuts 25. The check nut may be locked to the shaft by means of a suitable thread lock arrangement. I prefer to form a transverse slit 28 and screw a screw 24^A through the partly severed portion 27 into the inward part of the nut 25.

A guard plate 36 which preferably forms part of a plate 64 may be applied to protect the track and other mechanism.

To facilitate the removal of the interior parts I provide the casing 23^C with a removable portion 57 which is secured to the ends 58 and 59 of the casting.

The shaft 30 extends for enough beyond the idler wheel 29 to receive a rectangular block 33. The block 33 which is secured to the end of the shaft 30 by means of a nut 39 and a washer 38, has a sliding fit in a slot 35 in plate 36. By means of mechanism including a rod 74 screw-threaded in a bore 73 in a lug 72 on plate 71^A and a nut 75 the shaft 29 may be adjusted to regulate the tension of the track.

I claim:—

1. The combination with a tractor frame and sprocket wheels thereon, of a track composed of pivotally interconnected links, the links having an outer surface which is longer than the inner surface and curved end surfaces between the said surfaces providing spaces for engagement with the sprocket teeth.

2. The combination with a tractor frame and sprocket wheels thereon, of a track composed of a plurality of endless rows of pivotally interconnected links, the links in each row being substantially in abutting relation and at their adjoining ends have inwardly receding surfaces providing spaces for engagement with the sprocket teeth.

3. The combination with a tractor frame and sprocket wheels thereon, of a track composed of a plurality of endless rows of pivotally interconnected links, the adjoining rows being in contact with each other and the links in each row being substantially in abutting relation, the adjoining ends of links in each row having inwardly receding surfaces providing spaces for engagement with the sprocket teeth.

4. The combination with a tractor frame and sprocket wheels thereon, of a track composed of a plurality of endless rows of links, means for pivotally interconnecting the links in each row and the different rows in staggered relation, said means including two pivot openings in each link and pivot pins extending therethrough, each pivot hole being disposed substantially midway between the center and one end of a link, whereby the links in each row are substantially in abutting relation, and the adjoining ends of the links in each row having inwardly receding surfaces providing spaces for engagement with the sprocket teeth.

5. The combination with a tractor frame and sprocket wheels thereon, of a track composed of a plurality of endless rows of pivotally interconnected links, the links being so disposed as to offer to the ground a substantially continuous surface, and transverse teeth on the outer surfaces of the links, the links in each row having at their adjoining ends inwardly receding surfaces providing spaces for the engagement with the sprocket teeth.

In testimony whereof, I affix my signature in presence of two witnesses.

JOHN GEORGE LEYNER.

Witnesses:
 ALEXANDER KINZIE,
 G. SARGENT ELLIOTT.